United States Patent [19]

McCarthy

[11] 4,015,327

[45] Apr. 5, 1977

[54] METHOD OF MAKING A DECORATIVE STEREO SPEAKER ENCLOSURE

[75] Inventor: Peter McCarthy, Weston, Canada

[73] Assignee: Lawrence Peska Associates, Inc., New York, N.Y. ; a part interest

[22] Filed: Mar. 26, 1976

[21] Appl. No.: 670,627

[52] U.S. Cl. ................................ 29/460; 29/169.5; 179/1 E; 264/222; 264/DIG. 30

[51] Int. Cl.² ....................... B23P 3/00; B23P 19/04

[58] Field of Search .......... 29/169.5, 460; 264/222, 264/DIG. 30; 179/1 E

[56] References Cited

UNITED STATES PATENTS

| | | | |
|---|---|---|---|
| 1,675,202 | 6/1928 | Warne | 264/DIG. 30 UX |
| 2,281,227 | 4/1942 | Brady | 264/222 |
| 2,977,636 | 4/1961 | McGuire | 264/222 X |
| 3,302,276 | 2/1967 | Williams et al. | 29/460 X |
| 3,384,074 | 5/1968 | Rautiola et al. | 179/1 E UX |
| 3,537,930 | 11/1970 | Anderson | 264/222 X |
| 3,696,090 | 10/1972 | Lampe | 264/222 X |

FOREIGN PATENTS OR APPLICATIONS

| | | | |
|---|---|---|---|
| 595,892 | 4/1960 | Canada | 264/222 |

*Primary Examiner*—Charlie T. Moon

[57] ABSTRACT

A decorative enclosure and a method for making such enclosure is disclosed in which a face mask of a person is made by applying a liquid material to the face, the material hardening at body temperature after which a casting is made from the hardened material. A hollow base is positioned in the casting before it is set and a sound speaker is mounted in the frame. A plastic coating is applied to the casting, the coating once hardened being painted in colors to duplicate the face on which the film was cast. In this manner, a personalized hi-fidelity speaker enclosure may be obtained.

9 Claims, 4 Drawing Figures

METHOD OF MAKING A DECORATIVE STEREO SPEAKER ENCLOSURE

SUMMARY OF THE INVENTION

The present invention relates to a method for manufacturing a decorative enclosure such as a speaker enclosure for a sound reproducing system comprising making a face mask of a person by applying a liquid polymeric material such as a latex material to the face of a person, said polymeric material being fusible to form a substantially continuous flexible film at about human body temperature, maintaining the polymeric material on the face of a person until said polymeric material forms a substantially continuous cast film having three-dimensional contours conforming to the surface on which it was cast, removing said substantially continuous film and filling said contours with a pourable material that is capable of hardening such as plaster of paris, in order to form a casting. Before the casting is hardened, a hollow frame is embedded in the pourable material at the base or neck of the casting to obtain a three-dimensional casting having a frame secured to the base thereof. The casting is then coated with a plastic material such as a polyester having polymerizable unsaturation, the polyester being mixed with a vinyl monomer and an addition polymerization catalyst such as a peroxide or an azo compound. The casting thus coated is then painted so that the casting will further resemble the features of the face from which it was made.

In a further embodiment, a release agent such as a silicone lubricant, e.g., a silicone oil or a silicone grease known in the art is applied to the face prior to applying the polymeric material or latex to the face.

DETAILED DESCRIPTION

Figure 1:
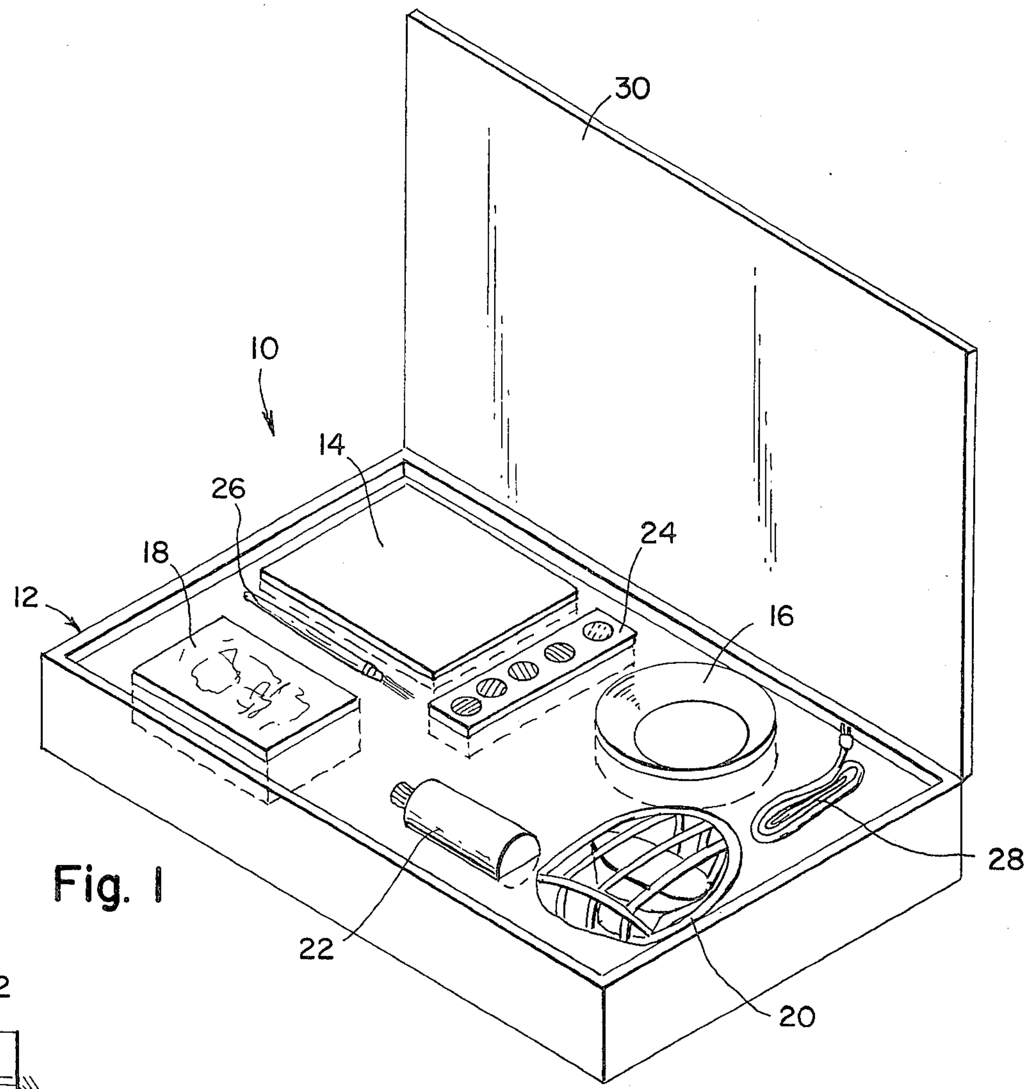
FIG. 1 is a three-dimensional view illustrating a kit containing a liquid polymer material for making face molds; a paint set and brush; a holder for the casting made of the face; a wire, plug, frame and speaker base; coating material for coating a casting made with the components of the kit and a durable, hardenable material such as plaster of paris used in making a casting according to one embodiment of the present invention.

The present invention relates to a method for the manufacture of a decorative enclosure for housing a speaker for reproducing recorded sound, a kit employed in such manufacturing process as well as the speaker assembly itself.

One of the objects of the present invention is to provide a method for manufacturing a speaker enclosure which resembles a human face.

It is a further object of the present invention to provide means for manufacturing a speaker enclosure in which a person can make a casting resembling their own facial features and insert in the casing a speaker for the reproduction of sound.

It is a further object of the present invention to provide a novelty item whereby a person is able to make a casting of their own face and insert a speaker for the reproduction of sound in the casting.

These and other objects of the invention will be understood by reference to the specification and claims that follow as well as the appended drawing.

The present invention comprises a kit for the manufacture of castings of a person's face whereby a speaker enclosure may be embedded in the casting. The invention also relates to a method for making such castings having a speaker enclosure therein.

Referring to the drawings, a kit 10 is illustrated comprising a box 12 having a hinged cover 30 and a liquid polymeric material such as a latex in a container 14, the polymeric material or latex being fusible to form a substantially continuous flexible film at about human body temperature. A holder 16 is also provided in the kit, the holder being employed to hold any contoured film produced by means of the polymeric material in the process of making a casting. A pourable material that is capable of hardening such as plaster of paris 18 is also provided along with a hollow frame 20 and a container 22 of a plastic material that is liquid and which may be employed to coat any castings, the coating capable of hardening after it is formed.

A paint set 24 and paint brush 26 are also provided for decorating any casting made employing the method of the present invention. A wire and plug 28 for the speaker is also provided.

Figure 2:
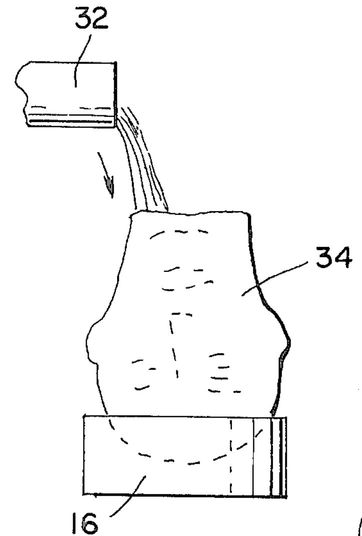
FIGS. 2, 3 and 4 illustrate the various steps in manufacturing the decorative enclosure according to another embodiment of the present invention.
Figure 3:
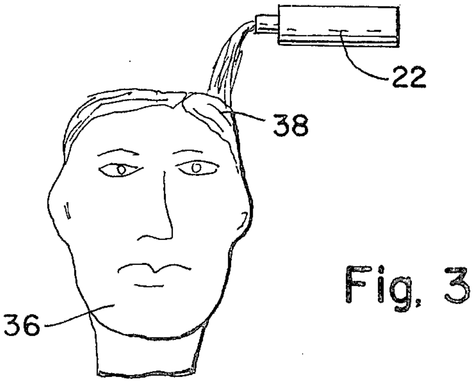
Figure 4:
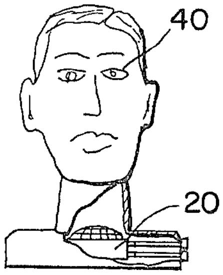

FIGS. 2 through 4 illustrate the steps in the manufacture of a decorative enclosure according to the present invention, FIG. 2 showing the casting of a face in a film 34 of polymeric material having three-dimensional configurations conforming to facial features, the film being cast with a hardenable material such as plaster of paris being poured from container 32.

FIG. 3 illustrates another step in the production of the speaker enclosure of the present invention in which the contents of the bottle 22 are being applied as a coating 38 to the outer surface of the castings 36.

FIG. 4 illustrates a completed casting 40 having a coating over the exterior thereof and which has been decorated by means of paint set 24 and brush 26 so that the features on the casting more closely resemble those of the face from which it was made.

In use, a face mask is made by applying the polymeric material such as rubber or a polymeric latex to a face after a release agent such as a silicone oil or a silicone grease well known in the art is applied to the skin of the face. The polymeric material or latex material is fusible to form a continuous film or substantially continuous film at the temperature of the human body (about 98.6° F.) after which the film is removed and a hardenable pourable material such as plaster of paris is employed to fill the three-dimensional contours of the film. During this casting operation, the film 34 is supported in holder 16 and while the hardenable material such as plaster of paris is still unhardened or in a fluid state, the frame and speaker base 20 is inserted in the base thereof such as in the neck area as illustrated in FIG. 4. The frame, such as a mesh frame or a frame having projections thereon is secured in the hardenable material or plaster casting upon hardening after which a speaker for sound reproduction is inserted in the hollow frame and the wire 28 connected thereto so that the speaker may be connected to an amplification circuit. The casting 36 thus obtained is coated with a hardenable plastic material such as an unsaturated polyester that is hardened by reaction with a vinyl monomer in combination with an addition polymer catalyst such as a peroxide or an azo compound. Upon hardening, the coating 38 is decorated by means of the colors 24 and brush 26 provided in kit 12 so that the casting more nearly resembles the face from which it was made.

Although the invention has been described by reference to some embodiments, it is not intended that the novel enclosure be limited thereby, but that modifications thereof are intended to be included as falling within the broad spirit and scope of the foregoing disclosure, the following claims and the appended drawing.

I claim:

1. A method for manufacturing a decorative enclosure comprising making a face mask of a person by applying a liquid polymeric material to the face of a person, said polymeric material being fusible to form a substantially continuous flexible film at about human body temperature, maintaining said polymeric material on the face of a person until said polymeric material forms a substantially continuous cast film having three-dimensional contours conforming to the surface it is applied to, removing said substantially continuous film and filling said contours with a pourable material that is capable of hardening to form a casting embedding a hollow frame in said pourable material at the base of said casting to obtain a casting having said frame secured to the base thereof, mounting a sound transducer in said frame.

2. The method of claim 1 further comprising coating said casting with a plastic material.

3. The method of claim 1 where said polymeric material comprises a latex polymer.

4. The method of claim 1 comprising applying a release agent to the face of a person prior to applying said liquid polymeric material.

5. The method of claim 4 where said release agent comprises a silicone lubricant.

6. A method for manufacturing a decorative loud speaker enclosure comprising making a face mask of a person by applying a release agent to the face of a person applying a liquid polymeric material to such face of a person, said polymeric material being fusable to form a substantially continuous flexible film at about human body temperature, maintaining said polymeric material on the face of a person until said polymeric material forms a substantially continuous cast film having three-dimensional contours conforming to the surface it was applied to, removing said substantially continuous film and filling said contours with a pourable material that is capable of hardening in order to form a casting, mounting said film in a base embedding a hollow frame in said pourable material at the neck of said casting to obtain a three-dimensional casting having said frame secured to the base thereof to obtain a three-dimensional casting having said frame secured to the base thereof, securing a loud speaker comprising a sound transducer in said frame, coating said casting with a plastic material, decorating said casting which has been coated with colors to duplicate the facial features from which said film was cast.

7. The method of claim 6 where said release agent comprises a silicone lubricant.

8. The method of claim 8 where said pourable material that is capable of hardening comprises a mixture of plaster of paris and water.

9. The method of claim 8 where said coating for said casting comprises a polymeric unsaturated polyester mixed with a vinyl monomer and an addition polymerization catalyst.

* * * * *